US012640103B2

(12) United States Patent
Lee et al.

(10) Patent No.: US 12,640,103 B2
(45) **Date of Patent: *May 26, 2026**

(54) DISPLAY DEVICE AND METHOD OF DRIVING THE SAME

(71) Applicant: LG Display Co., Ltd., Seoul (KR)

(72) Inventors: Wonsuk Lee, Paju-si (KR); Hyunjae Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/801,196

(22) Filed: Aug. 12, 2024

(65) Prior Publication Data

US 2024/0404477 A1 Dec. 5, 2024

Related U.S. Application Data

(63) Continuation of application No. 17/863,230, filed on Jul. 12, 2022, now Pat. No. 12,087,236, which is a continuation of application No. 16/665,918, filed on Oct. 28, 2019, now Pat. No. 11,410,613.

(30) Foreign Application Priority Data

Nov. 9, 2018 (KR) ........................ 10-2018-0137504

(51) Int. Cl.

| | |
|---|---|
| ***G09G 3/3275*** | (2016.01) |
| ***G09G 3/20*** | (2006.01) |
| ***G09G 3/3258*** | (2016.01) |
| ***G09G 3/3266*** | (2016.01) |
| ***G09G 3/3291*** | (2016.01) |

(52) U.S. Cl.

CPC ......... *G09G 3/3275* (2013.01); *G09G 3/2074* (2013.01); *G09G 3/3258* (2013.01); *G09G 3/3266* (2013.01); *G09G 3/3291* (2013.01); *G09G 2300/0413* (2013.01); *G09G 2310/08* (2013.01); *G09G 2320/0233* (2013.01); *G09G 2320/064* (2013.01); *G09G 2320/0673* (2013.01); *G09G 2320/0686* (2013.01)

(58) Field of Classification Search

None

See application file for complete search history.

(56) References Cited

U.S. PATENT DOCUMENTS

| | | | | |
|---|---|---|---|---|
| 8,519,925 | B2 | 8/2013 | Phan | |
| 8,698,859 | B2 | 4/2014 | DeLuca | |
| 9,129,347 | B2 * | 9/2015 | Deluca | G09G 5/391 |

(Continued)

FOREIGN PATENT DOCUMENTS

| | | | |
|---|---|---|---|
| CN | 1953027 | A | 4/2007 |
| CN | 107342053 | A | 11/2017 |

(Continued)

*Primary Examiner* — Dorothy Harris

(74) *Attorney, Agent, or Firm* — Birch, Stewart, Kolasch & Birch, LLP

(57) ABSTRACT

Discussed is a display device having a display panel including a first display area in which sub-pixels are arranged and a second display area in which the sub-pixels are not arranged in at least a portion, a gate driver that supplies at least one gate signal to the first display area and the second display area, and at least one dummy gate line disposed over the second display area, to which no sub-pixels are connected.

22 Claims, 14 Drawing Sheets

(56) References Cited

U.S. PATENT DOCUMENTS

| | | | | |
|---|---|---|---|---|
| 9,785,269 | B2 | 10/2017 | Lee et al. | |
| 10,529,269 | B2 | 1/2020 | Moon et al. | |
| 11,322,088 | B2 * | 5/2022 | Matsueda | G09G 3/3233 |
| 12,087,236 | B2 * | 9/2024 | Lee | G09G 3/3258 |
| 2002/0080313 | A1 | 6/2002 | Lim | |
| 2002/0126112 | A1 * | 9/2002 | Kato | G09G 3/3696 345/204 |
| 2002/0167531 | A1 | 11/2002 | Baudisch | |
| 2004/0227703 | A1 * | 11/2004 | Lamvik | G09G 3/3233 348/E5.145 |
| 2005/0134549 | A1 | 6/2005 | Kamiya et al. | |
| 2006/0050029 | A1 | 3/2006 | Toyoda et al. | |
| 2006/0146035 | A1 * | 7/2006 | Cha | G09G 3/3648 345/173 |
| 2006/0158588 | A1 * | 7/2006 | Uh | G02F 1/133514 349/114 |
| 2010/0253664 | A1 | 10/2010 | Byun et al. | |
| 2011/0050751 | A1 | 3/2011 | Park et al. | |
| 2011/0187754 | A1 | 8/2011 | Yoo | |
| 2012/0002802 | A1 | 1/2012 | Brieskom et al. | |
| 2013/0293526 | A1 | 11/2013 | Igawa | |
| 2014/0332830 | A1 | 11/2014 | Fan et al. | |
| 2015/0042546 | A1 | 2/2015 | Ahn et al. | |
| 2015/0091953 | A1 | 4/2015 | Wu | |
| 2015/0187275 | A1 | 7/2015 | Park et al. | |
| 2016/0049113 | A1 | 2/2016 | Park | |
| 2017/0076654 | A1 * | 3/2017 | Wang | G09G 3/2074 |
| 2017/0316744 | A1 * | 11/2017 | Oh | G09G 3/2007 |
| 2018/0129328 | A1 | 5/2018 | Park et al. | |
| 2019/0035323 | A1 * | 1/2019 | Jian | G09G 3/3677 |
| 2020/0234634 | A1 * | 7/2020 | Li | G09G 3/3208 |
| 2022/0014942 | A1 | 1/2022 | Ying et al. | |
| 2022/0157236 | A1 | 5/2022 | Feng et al. | |

FOREIGN PATENT DOCUMENTS

| | | | |
|---|---|---|---|
| CN | 107741797 | A | 2/2018 |
| CN | 108766347 | A | 11/2018 |
| JP | 2007-94089 | A | 4/2007 |
| KR | 10-2013-0066752 | A | 6/2013 |
| KR | 10-2017-0124684 | A | 11/2017 |
| KR | 10-2017-0136128 | A | 12/2017 |
| KR | 10-2018-0002430 | A | 1/2018 |

* cited by examiner

DISPLAY DEVICE AND METHOD OF DRIVING THE SAME

CROSS-REFERENCE TO RELATED APPLICATION

This Application is a Continuation of U.S. patent application Ser. No. 17/863,230, filed on Jul. 12, 2022 (now U.S. Pat. No. 12,087,236, issued on Sep. 10, 2024), which is a Continuation of U.S. patent application Ser. No. 16/665,918 filed on Oct. 28, 2019 (now U.S. Pat. No. 11,410,613 issued on Aug. 9, 2022), which claims the priority benefit of Korean Patent Application No. 10-2018-0137504 filed on Nov. 9, 2018 in the Republic of Korea, the entire contents of all these applications are hereby expressly incorporated by reference into the present application.

BACKGROUND OF THE INVENTION

Field of the Invention

The present invention relates to a display device in which a signal panel comprises areas that differ in the number of sub-pixels per unit area and a method of driving the same.

Related Art

The market for display devices which act as an intermediary between users and information is growing with the development of information technology. Conventionally, large-screen displays, such as TVs and monitors, were trending, whereas recently, flat-panel display technologies are developing rapidly because flat-panel displays can be fit to portable devices.

Active-matrix addressed displays display moving images by using thin-film transistors (hereinafter, "TFTs") as switching elements. Such display devices are widely used in various fields involving the provision of visual information because of their slim and lightweight design.

In some of these display devices, a single panel comprises areas that differ in pixel density (or pixels per inch (PPI)). For example, a main area for displaying images that require a high resolution is designed to have a high pixel density, and a sub area for displaying added information is designed to have a low pixel density.

Such a single panel comprising areas that differ in the pixel density has, however, the problem of brightness non-uniformity which can happen when the same data is outputted.

SUMMARY OF THE INVENTION

The present invention is directed to preventing brightness non-uniformity in a display device in which a single panel comprises areas that differ in the number of sub-pixels per unit area.

An exemplary embodiment of the present invention provides a display device comprising a display panel comprising a first display area and a second display area that differ in the number of sub-pixels per unit area; a gamma part that generates a first area gamma voltage applied to the first display area and a second area gamma voltage applied to the second display area; and a data driver that generates data voltages by applying the first area gamma voltage to video data displayed in the first display area and applying the second area gamma voltage to video data displayed in the second display area and supplies the data voltages to the sub-pixels in the corresponding areas.

The first display area can comprise more sub-pixels than the second display area, and the first area gamma voltage and the second area gamma voltage can be set in such a way as to output higher data voltages to the second area than to the first area.

The display device can further comprise a scan driver that sequentially supplies a scan signal to the first display area and the second display area.

The display panel can comprise a plurality of data lines connected to the data driver and a plurality of gate lines connected to the scan driver; and at least one dummy gate line between the first display area and the second display area, to which no sub-pixels are connected.

The data driver can supply no data voltage by holding video data while the scan signal is supplied to the dummy gate line.

The scan driver can control the sub-pixels in the first display area and the sub-pixels in the second display area to have different emission times.

The scan driver can supply a pulse width modulation (PWM) control so that either the first display area or the second display area, whichever has fewer sub-pixels, has a longer emission time.

The display device can further comprise a power supply part that generates first display area high-potential power for the first display area and second display area high-potential power for the second display area, and supplies the first and second display area high-potential powers to the corresponding display areas.

The power supply part can supply high-potential power of higher potential to either the first display area or the second display area, whichever has fewer sub-pixels.

The gamma part can comprise a resistor string that receives a maximum gamma voltage at one end of the resistor string and a minimum gamma voltage at another end of the resistor string, and divides the maximum gamma voltage and the minimum gamma voltage into a plurality of voltages and outputs the same; a minimum and maximum gray level gamma voltage selection part that receives the plurality of voltages outputted from the resistor string, and selects and outputs a 0 gray level gamma voltage being the minimum gray level, a 1 gray level gamma voltage, and a 255 gray level gamma voltage being the maximum gray level; a tap voltage output part that supplies a plurality of tap voltages; and a voltage-dividing circuit that receives and divides the minimum gray level gamma voltage, the maximum gray level gamma voltage, and the tap voltages to produce 0 to 255 gray level gamma voltages.

The resistor string can selectively receive a maximum gamma voltage for the first display area and a maximum gamma voltage for the second display area.

The minimum and maximum gray level gamma voltage selection part can select and output a 0 gray level gamma voltage being the minimum gray level, a 1 gray level gamma voltage, and a 255 gray level gamma voltage being the maximum gray level, in accordance with a selection signal for selecting one of the first display area and the second display area.

The tap voltage output part can select and output a tap voltage in accordance with a selection signal for selecting one of the first display area and the second display area.

Another exemplary embodiment of the present invention provides a display device comprising a display panel comprising data lines, gate lines, sub-pixels, and a first display area and a second display area that differ in the number of sub-pixels per unit area; a data drive circuit that converts digital video data to analog data voltages using a gamma voltage and supplies the data voltages to the data lines; a gate drive circuit that sequentially supplies a scan signal synchronized with the data voltages to the gate lines; and a gamma voltage generating circuit that supplies the gamma voltage to the data drive circuit, wherein the gamma voltage generating circuit supplies a first area gamma voltage while the scan signal is supplied to the gate lines in the first display area and supplies a second area gamma voltage while the scan signal is supplied to the gate lines in the second display area.

The first display area can have more sub-pixels per unit area than the second display area, and the first area gamma voltage and the second area gamma voltage can be set in such a way that higher data voltages are outputted to the second display area than to the first display area.

The display panel can comprise at least one dummy gate line between the first display area and the second display area, to which no sub-pixels are connected.

The data driver can supply no data voltage by holding video data while the scan signal is supplied to the dummy gate line.

Another exemplary embodiment of the present invention provides a method of driving a display device which comprises a display panel comprising data lines, gate lines, sub-pixels, and a first display area and a second display area that differ in the number of sub-pixels per unit area, the method comprising converting digital video data displayed in the second display area to first data voltages using a second area gamma voltage and supplying the first data voltages to the corresponding data lines; and converting digital video data displayed in the first display area to second data voltages using a first area gamma voltage and supplying the second data voltages to the corresponding data lines.

According to an example of the present invention, in a case where a single panel comprises areas that differ in the number of sub-pixels per unit area, higher data voltages can be applied to a display area with fewer sub-pixels per unit area, thereby ensuring brightness uniformity.

According to an example of the present invention, in a case where there are a first display area with more sub-pixels per unit area and a second display area with fewer sub-pixels per unit area, different gamma voltages can be supplied to the first and second display areas in such a way as to apply higher data voltages to the second display area, thereby ensuring brightness uniformity across the display panel. At the same time, a dummy gate line can be arranged between the first display area and the second display area so that the output voltage of the data driver changes stably with changing gamma voltage. Moreover, high-potential power EVDD having a higher potential than the high-potential power EVDD for the first display area can be supplied to the second display area, and the pulse width can be modulated to increase the emission time for the second display area, thereby further reducing the brightness difference between the first display area and the second display area.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DESCRIPTION OF THE EMBODIMENTS

Figure 1:
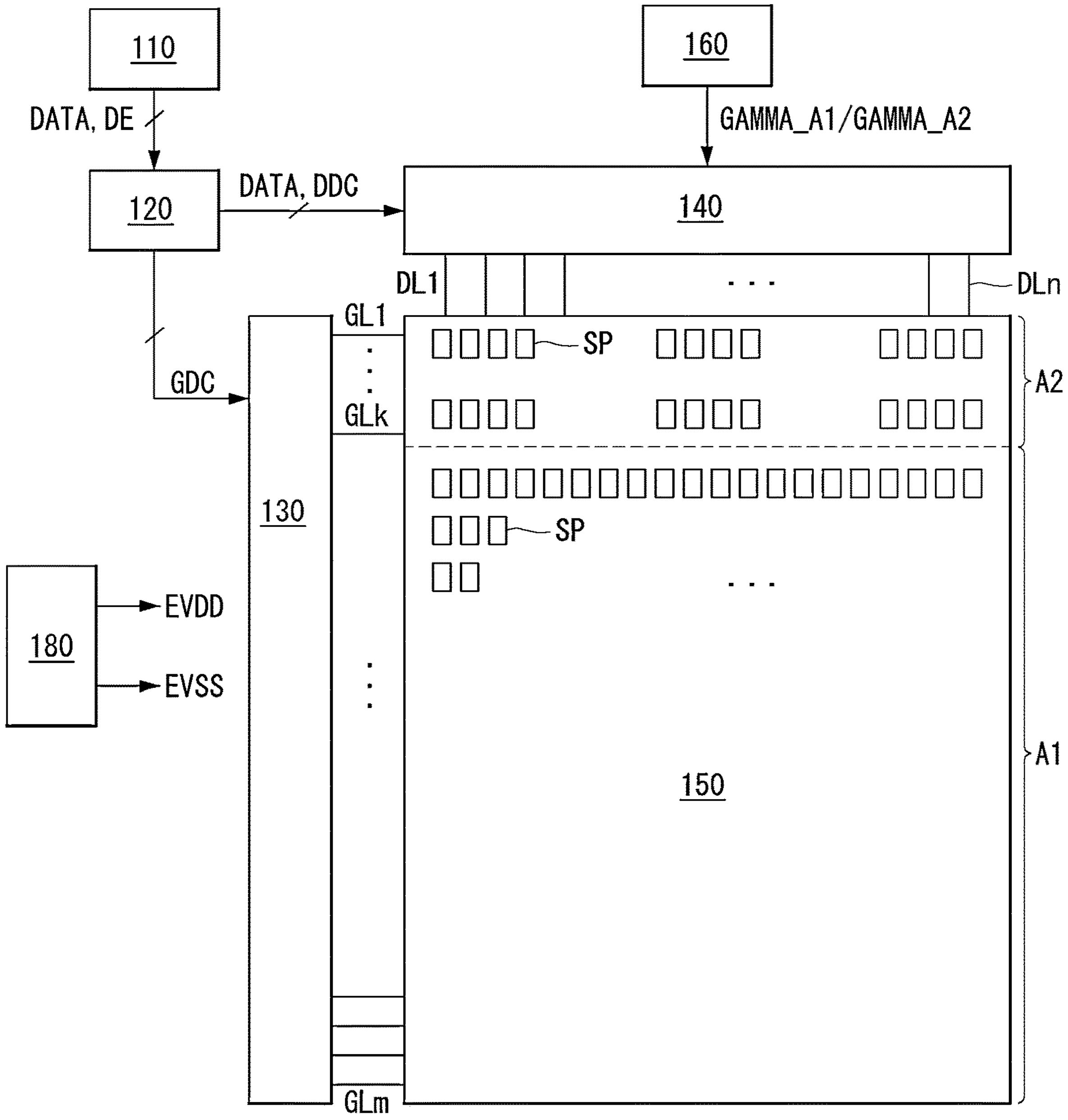
FIG. 1 is a schematic block diagram of a display device according to an exemplary embodiment of the present invention.

Advantages and features of the present disclosure and methods of accomplishing the same can be understood more readily by reference to the following detailed description of preferred embodiments and the accompanying drawings. The present invention can, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

The shapes, sizes, proportions, angles, numbers, etc. shown in the figures to describe the exemplary embodiments of the present invention are merely examples and not limited to those shown in the figures. Like reference numerals denote like elements throughout the specification. When the terms 'comprise', 'have', 'consist of' and the like are used, other parts can be added as long as the term 'only' is not used. The singular forms can be interpreted as the plural forms unless explicitly stated.

The elements can be interpreted to include an error margin even if not explicitly stated.

When the position relation between two parts is described using the terms 'on', 'over', 'under', 'next to' and the like, one or more parts can be positioned between the two parts as long as the term 'immediately' or 'directly' is not used.

It will be understood that, although the terms first, second, etc., can be used to describe various elements, these elements should not be limited by these terms. These terms are only used to distinguish one element from another element. Thus, a first element discussed below could be termed a second element without departing from the technical idea of the present invention.

Like reference numerals denote like elements throughout the specification.

Hereinafter, an exemplary embodiment of the present invention will be described with reference to the accompanying drawings. In describing the present invention, detailed descriptions of related well-known technologies will be omitted to avoid unnecessary obscuring the present invention.

A display device according to one or more embodiments of the present invention can be implemented as a navigation system, a video player, a personal computer (PC), a wearable device (watch or glasses), a mobile phone (smartphone), etc. A display panel of the display device can be, but is not limited to, a liquid-crystal display panel, an organic light-emitting display panel, an electrophoretic display panel, or a plasma display panel. In the description below, an organic electroluminescence display will be given as an example for convenience of explanation.

Figure 2:
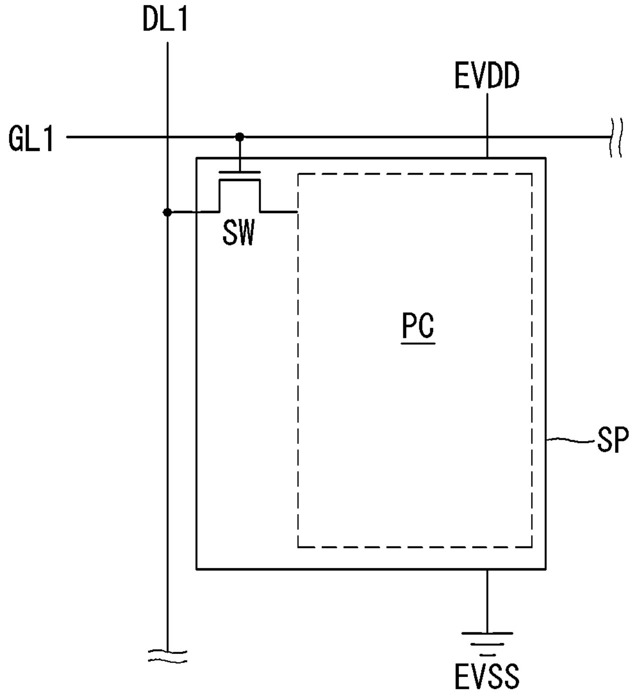
FIG. 2 is a schematic configuration diagram of a sub-pixel.
Figure 3:
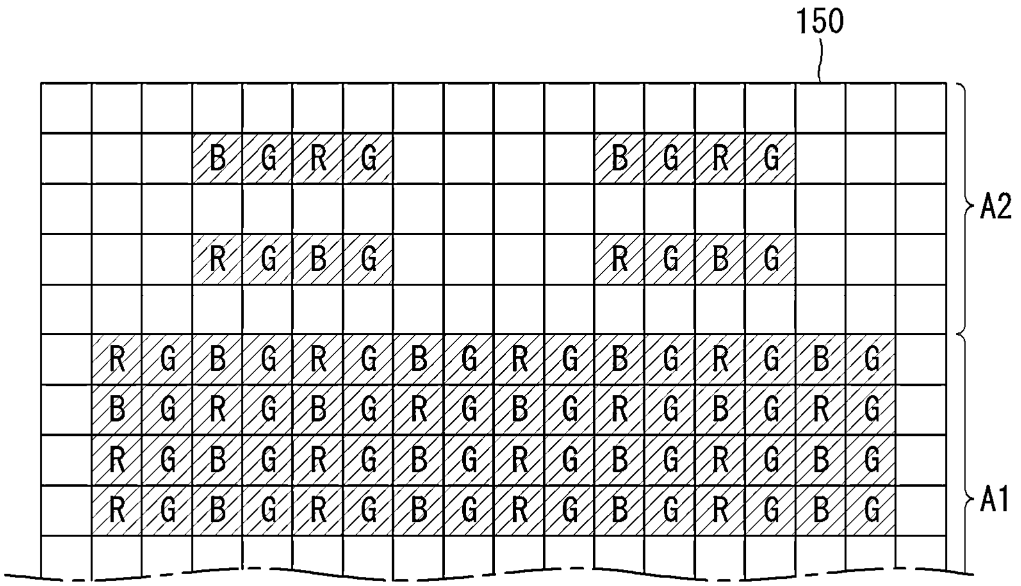
FIG. 3 is a view showing an arrangement of sub-pixels SP on the display panel of FIG. 1.

FIG. 1 is a schematic block diagram of a display device according to an exemplary embodiment of the present invention. FIG. 2 is a schematic configuration diagram of a sub-pixel SP shown in FIG. 1. FIG. 3 is a view showing an arrangement of sub-pixels SP on the display panel of FIG. 1. All the components of the display device according to all embodiments of the present invention are operatively coupled and configured.

Referring to FIG. 1, an organic light-emitting display comprises an image processor 110, a timing controller 120, a scan driver 130, a data driver 140, a gamma part 160, a display panel 150, and a power supply part 180.

The image processor 110 processes externally supplied data signal DATA into an image, and outputs a data enable signal DE, etc. The image processor 110 can output one or more among a vertical synchronization signal, horizontal synchronization signal, and clock signal, in addition to the data enable signal DE.

The timing controller 120 receives the data signal DATA from the image processor 110, along with the data enable signal DE or driving signals including the vertical synchronization signal, horizontal synchronization signal, and clock signal. Based on the driving signals, the timing controller 120 outputs a gate timing control signal GDC for controlling the operation timing of the scan driver 130 and a data timing control signal DDC for controlling the operation timing of the data driver 140.

In response to the data timing control signal DDC supplied from the timing controller 120, the data driver 140 samples and latches the data signal DATA supplied from the timing controller 120, and converts it to a data voltage based on gamma voltage GAMMA_A1/GAMMA_A2 provided from the gamma part 160 and outputs the data voltage. The data driver 140 outputs the data voltage through data lines DL1 to DLn. The data driver 140 can be formed in the form of an IC (integrated circuit).

In response to the gate timing control signal GDC supplied from the timing controller 120, the scan driver 130 outputs a scan signal. The scan driver 130 outputs a scan signal consisting of scan-high voltage and scan-low voltage through gate lines GL1 to GLm. The scan driver 130 is formed in the form of an IC (integrated circuit), or is formed on the display panel 150 by a gate-in-panel (GIP) technology.

The power supply part 180 generates first electric power EVDD and second electric power EVSS to supply to the display panel 150. The first electric power EVDD corresponds to high-potential power, and the second electric power EVSS corresponds to low-potential power. The power supply part 180 can generate electric power to supply to the scan driver 130, data driver 140, gamma part 160, etc., as well as electric power EVDD and EVSS to supply to the display panel 150, based on externally supplied input power.

The display panel 150 comprises sub-pixels SP which operate to display an image. As shown in FIG. 2, each sub-pixel SP comprises a switching transistor SW connected to a gate line GL1 and a data line DL1 and a pixel circuit PC driven in response to the data signal DATA supplied through the switching transistor SW. The pixel circuit PC comprises a driving transistor, a storage capacitor, a circuit such as an organic light-emitting diode, and a compensation circuit. In the sub-pixel SP, when the driving transistor turns on in response to the data voltage stored in the storage capacitor, a drive current is supplied to the organic light-emitting diode situated between a first power line EVDD and a second power line EVSS. The organic light-emitting diode emits light in response to the drive current.

The display panel 150 is connected to the scan driver 130 through a plurality of gate lines GL1 to GLm and connected to the data driver 140 through a plurality of data lines DL1 to DLn to display an image in response to scan signal and data voltage. Here, the data driver 140 converts digital video data to analog data voltages by using the gamma voltage GAMMA_A1/GAMMA_A2 outputted from the gamma part 160.

The plurality of sub-pixels SP on the display panel 150 are located at the intersections of the plurality of gate lines GL1 to GLm and the plurality of data lines DL1 to DLn. The display panel 150 can comprise a first display area A1 and second display area A2 that differ in pixel density (pixels per inch (PPI)). The gamma voltages of the first display area A1 and the second display area A2 can be divided based on the specific gate line GLk. The display panel 150 can comprise two or more areas that differ in PPI.

FIG. 3 is a view showing an arrangement of sub-pixels SP in the first display area A1 and second display area A2.

Referring to FIG. 3, the first display area A1 has more sub-pixels SP per unit area than the second display area A2, and the second display area A2 has fewer sub-pixels SP per unit area than the first display area A1. That is, the first display area A1 has a higher PPI than the second display area A2, and the second display area A2 has a lower PPI than the first display area A1.

The first display area A1 and the second display area A2 are divided along the gate lines. That is, if the gate lines are horizontal, the first display area A1 and the second display area A2 are vertically adjacent to each other, and if the gate lines are vertical, the first display area A1 and the second display area A2 are horizontally adjacent to each other. Thus, the sub-pixels SP in the first display area A1 are connected to the gate lines GL arranged in the first display area A1, and the sub-pixels SP in the second display area A2 are connected to the gate lines GL arranged in the second display area A2. On the other hand, the sub-pixels SP in the first display area A1 and second display area A2 arranged on the same vertical line are connected to the same data line DL. Here, when the sub-pixels SP in the first display area A1 and the sub-pixels SP in the second display area A2 are supplied with data of the same brightness, each sub-pixel SP has the same light emitting characteristics but the second display area A2 can have lower brightness than the first display area A1 since it has fewer sub-pixels SP. For example, if the number of sub-pixels SP in the second display area A2 is half the number of sub-pixels SP in the first display area A1, the brightness of the second display area A2 also can have half the brightness of the first display area A1. This can result in a decrease in brightness uniformity across the entire display panel.

To improve this, in the embodiments of the present invention, the gamma part 160 supplies different gamma voltages GAMMA_A1/GAMMA_A2 for the first display area A1 and the second display area A2 so as to apply higher data voltages to the second display area A2 with lower PPI than to the first display area A1 with higher PPI.

Figure 4:
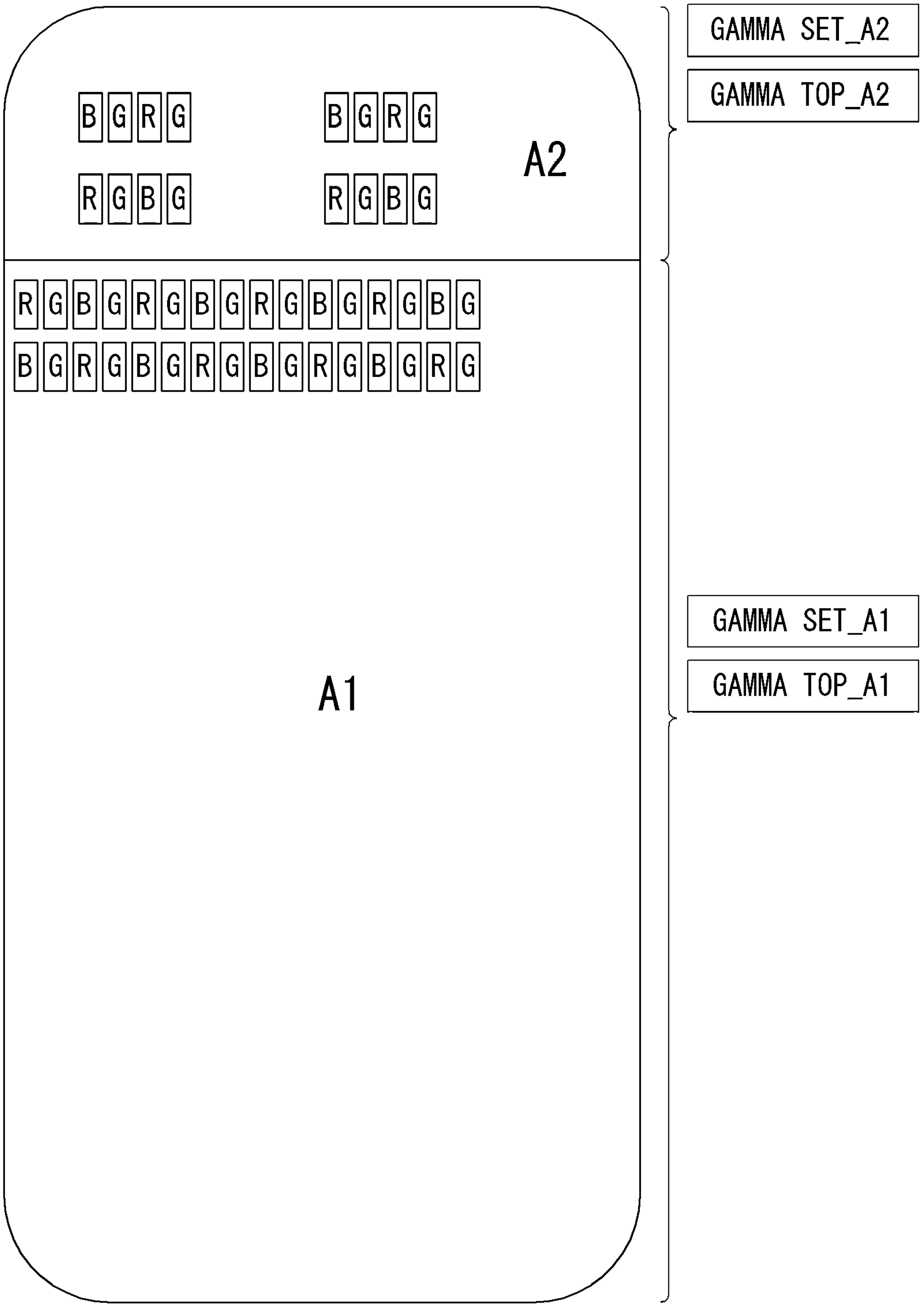
FIG. 4 is a view explaining a control method for a display device according to a first exemplary embodiment of the present invention.
Figure 5:
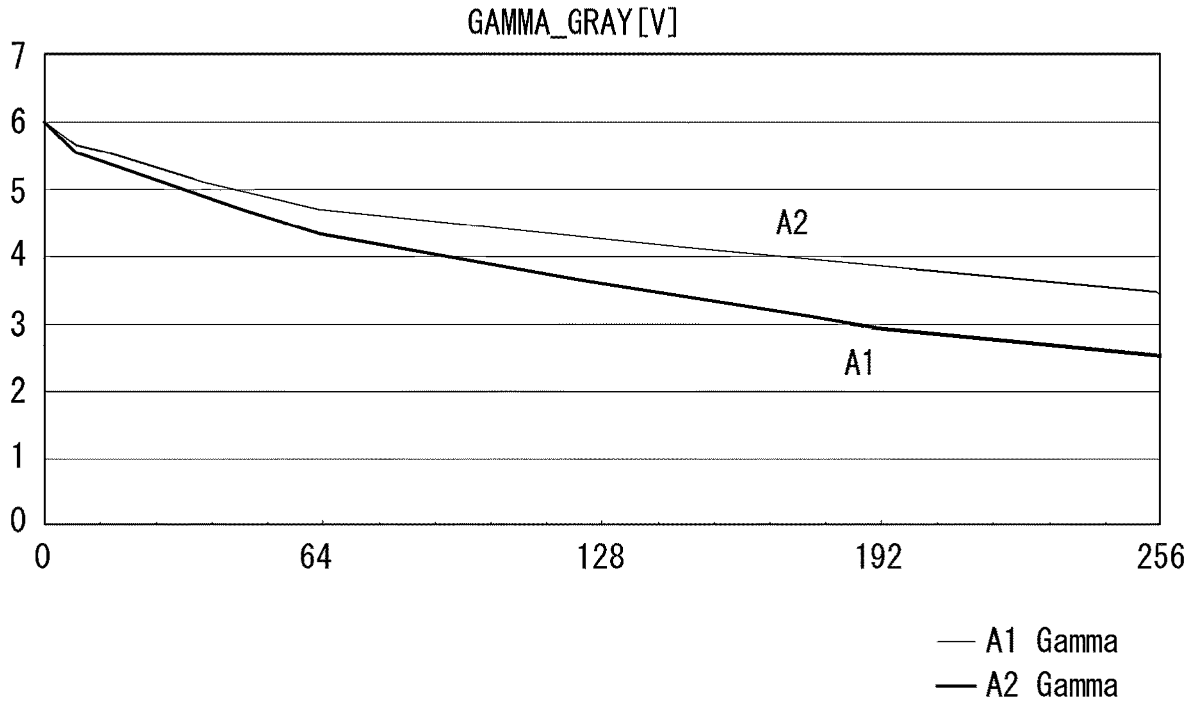
FIG. 5 is a view showing gamma curves for each area in the display device of FIG. 4.
Figure 6:
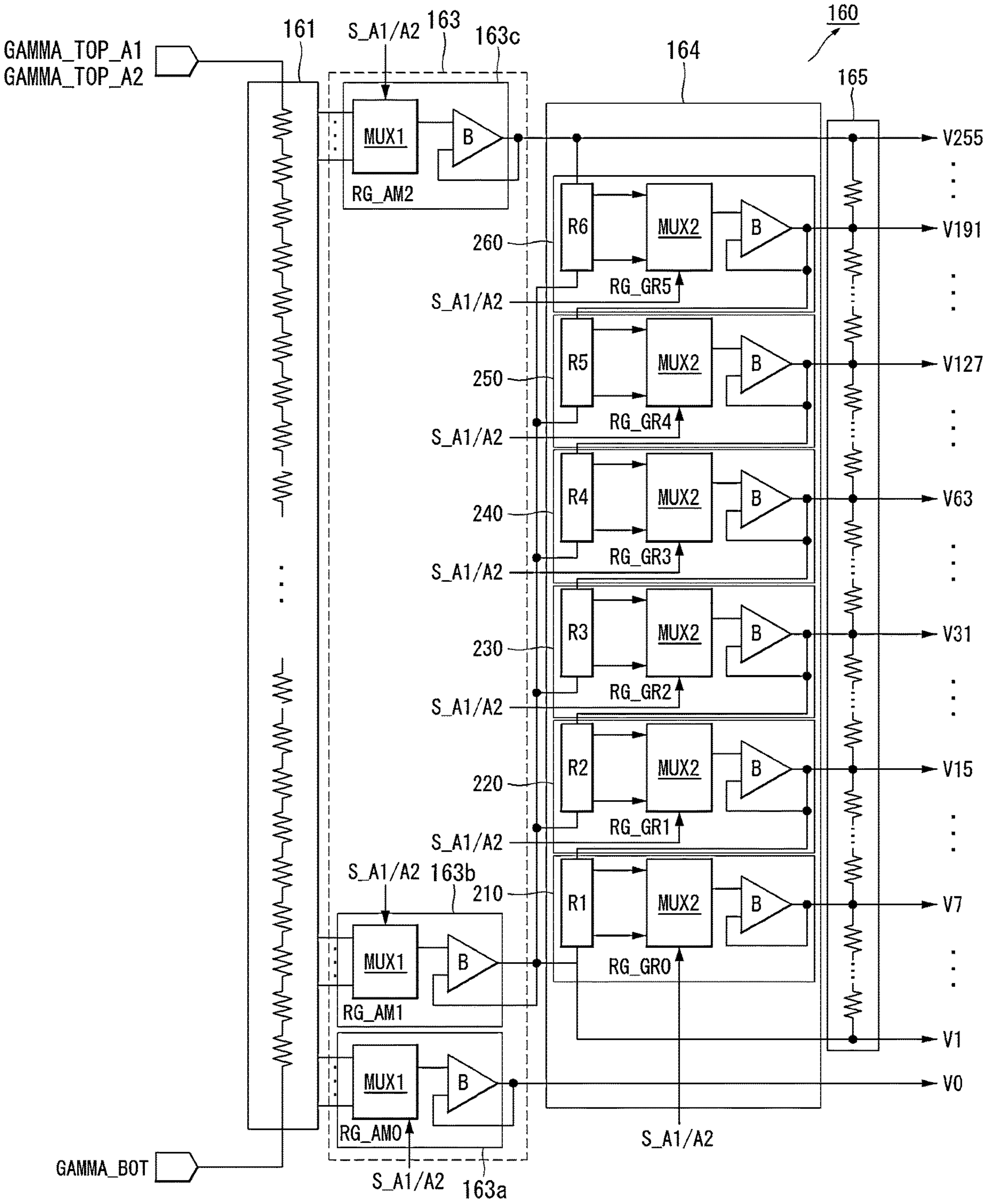
FIGS. 6 and 7 are views illustrating a circuit configuration of a gamma part in the display device of FIG. 4.
Figure 7:
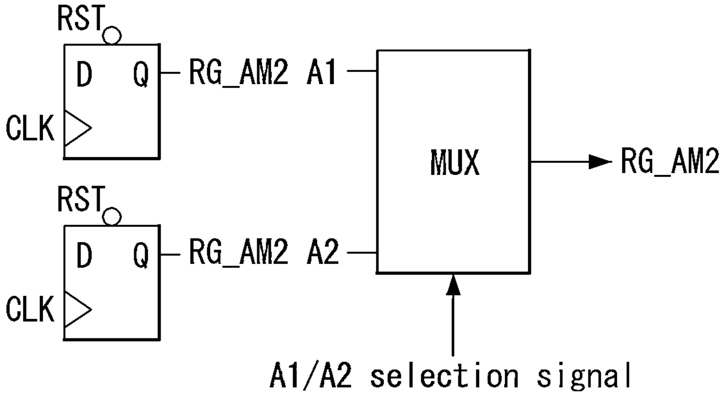
Figure 8:
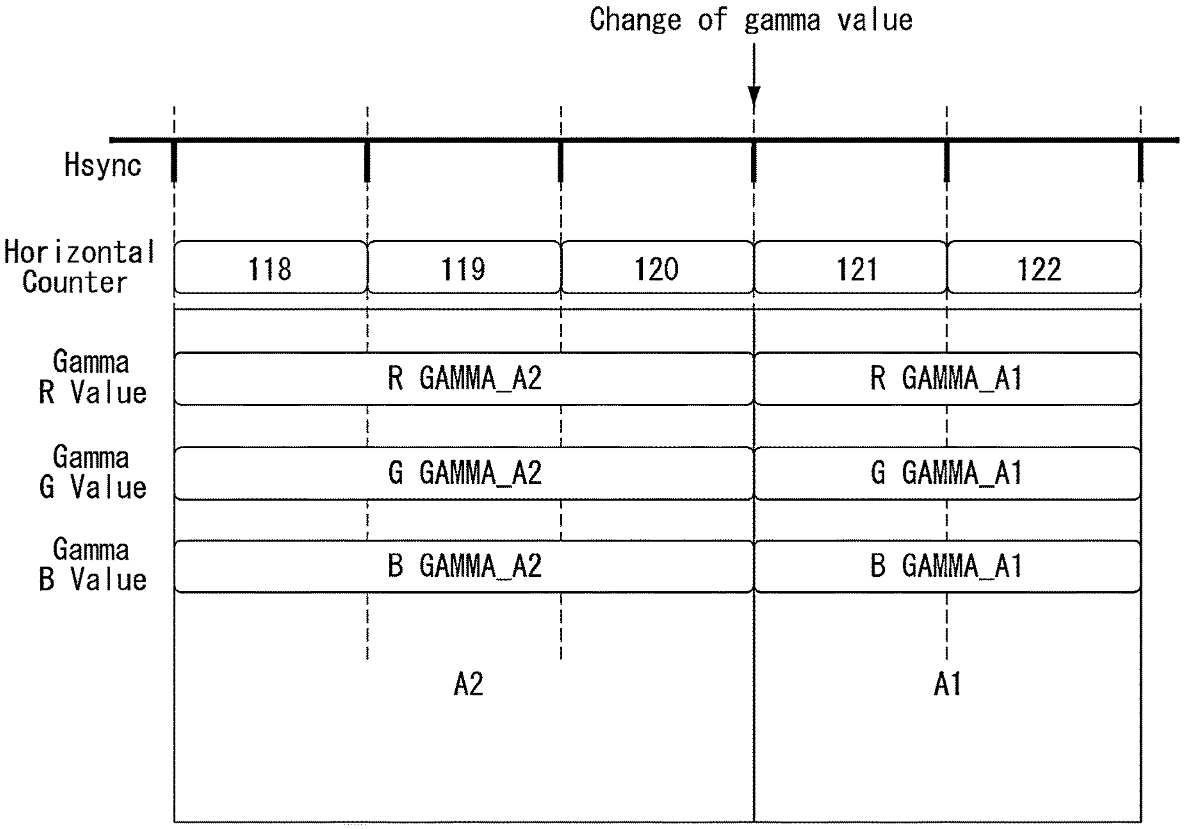
FIG. 8 is a driving waveform diagram of the display device of FIG. 4.

FIGS. 4 to 8 are views explaining a control method for a display device according to a first exemplary embodiment of the present invention. Particularly, FIG. 4 is a view illustrating gamma voltage settings for each area in the display device. FIG. 5 is a view showing gamma curves for each area. FIGS. 6 and 7 are views illustrating a circuit configuration of the gamma part in the display device of FIG. 4. FIG. 8 is a driving waveform diagram of the display device of FIG. 4.

Referring to FIG. 4, a first display area A1 and second display area A2 that differ in PPI can be formed within a single panel.

The first display area A1 has higher PPI than the second display area A2, and the second display area A2 has lower PPI than the first display area A1. In the present invention, different gamma voltages GAMMA_A1/GAMMA_A2 are applied for the first display area A1 and the second display area A2 by considering the difference in PPI between each display area.

Different maximum gamma voltages GAMMA_TOP_A1 and GAMMA_TOP_A2 and different gamma settings GAMMA SET_A1 and GAMMA SET_A2 are applied for the first display area A1 and the second display area A2.

FIG. 5 is a graph showing gamma curves for the first display area A1 and second display area A2. As in the graph in FIG. 5, the gamma voltage applied for the second display area A2 is higher than that applied for the first display area A1.

If the same data voltage is applied to the first display area A1 and the second display area A2, the second display area A2 can be seen to have lower brightness than the first display area A1. As such, gamma curves are applied in such a way that higher data voltages are applied for the second display area A2 with lower PPI than for the first display area A1 with higher PPI.

FIGS. 6 and 7 are views illustrating a circuit configuration of the gamma part 160.

The gamma part 160 comprises a resistor string 161, a minimum and maximum gray level gramma voltage selection part 163, a tap voltage output part 164, and a voltage-dividing circuit 165. Although the tap voltage output part 164 and the voltage-dividing circuit 165 can be provided for a red pixel (R), a green pixel (G), and a blue pixel (B) individually, the tap voltage output part 164 and the voltage-dividing circuit 165 can operate in substantially the same manner for each of the R, G, and B pixels.

The resistor string 161 divides a minimum gamma voltage GAMMA_BOT and a maximum gamma voltage GAMMA_TOP and outputs p voltages (p is a natural number greater than or equal to 2). The maximum gamma voltage GAMMA_TOP supplied to the resistor string 161 can be set differently such that the maximum gamma voltage GAMMA_TOP_A1 is supplied for the first display area A1 and the maximum gamma voltage GAMMA_TOP_A2 is supplied for the second display area A2.

The minimum and maximum gray level gramma voltage selection part 163 selects and outputs a 0 gray level gamma voltage V0, which is the minimum gray level, a 1 gray level gamma voltage V1, and a 255 gray level gamma voltage V255, which is the maximum gray level. The minimum and maximum gray level gamma voltage selection part 163 comprises a 0 gray level gamma voltage selection part 163*a*, a 1 gray level gamma voltage selection part 163*b*, and a 255 gray level gamma voltage selection part 163*c*. The 0 gray level gamma voltage selection part 163*a*, 1 gray level gamma voltage selection part 163*b*, and 255 gray level gamma voltage selection part 163*c* each comprise a first multiplexer MUX1 and an output buffer B.

The first multiplexer MUX1 receives an area selection signal S_A1/A2 for selecting either the first display area A1 or the second display area A2, and receives q voltages (q is a natural number that satisfies $2 \leq q \leq p$) among the p voltages outputted from the resistor string 161. Each first multiplexer MUX1 outputs one of the q voltages as a 0 gray level gamma voltage RG_AM0, 1 gray level gamma voltage RG_AM1, or 255 gray level gamma voltage RG_AM2, which is to be inputted to the first display area A1 or second display area A2 in response to the area selection signal S_A1/A2.

For example, the first multiplexer MUX1 of the 0 gray level gamma voltage selection part 163*a* receives an area selection signal S_A1/A2, and receives q voltages among the p voltages outputted from the resistor string 161. In response to the area selection signal S_A1/A2, the first multiplexer MUX1 outputs a 0 gray level gamma voltage RG_AM0_A1 for the first display area if the first display area A1 is selected, and outputs a 0 gray level gamma voltage RG_AM0_A2 for the second display area if the second display area A2 is selected. The output buffer B serves as a voltage follower. Meanwhile, the q voltages inputted to the first multiplexer MUX1 of each of the 0 gray level gamma voltage selection part 163*a*, 1 gray level gamma voltage selection part 163*b*, and 255 gray level gamma voltage selection part 163*c* can be different voltages.

The tap voltage output part 164 supplies a plurality of tap voltages to the voltage-dividing circuit 165. The tap voltages are voltages that the voltage-dividing circuit 165 divides to produce gamma voltages. The tap voltage output part 164 comprises first to h-th tap voltage output parts. When supplied with a plurality of tap voltages, the voltage-dividing circuit 165 divides the 0, 1 and 255 gray level gamma voltages RG_AM0, RG_AM1 and RG_AM2 and the plurality of tap voltages RG_GR0 to RG_GR5 to produce 0 to 255 gamma voltages V0 to V255.

The tap voltage output part 164 comprises a plurality of tap voltage selection parts 210, 220, 230, 240, 250, and 260. It should be noted that the tap voltage output part 164 in FIG. 6 is illustrated as comprising first to sixth tap voltage selection parts 210, 220, 230, 240, 250, and 260 but not limited thereto.

Each tap voltage selection part comprises resistors R1 to R6, a second multiplexer MUX2, and an output buffer B. The second multiplexer MUX2 receives an area selection signal S_A1/A2, and outputs one of u voltages outputted from the resistors R1 to R6 to the voltage-dividing circuit 165 depending on the selected display area. The output buffer B serves as a voltage follower. The tap voltages outputted from the tap voltage output part 164 have a value corresponding to the area selected in accordance with the area selection signal S_A1/A2.

The voltage-dividing circuit 165 divides a minimum gray level gamma voltage and a maximum gray level gamma voltage using a resistor string (R-string) to produce 0 to 255 gamma voltages V0 to V255. When supplied with a plurality of tap voltages, the voltage-dividing circuit 165 divides the 0, 1, and 255 gray level gamma voltages RG_AM0, RG_AM1, and RG_AM2 and the tap voltages to produce 0 to 255 gamma voltages V0 to V255. Here, since the tap voltages have a value corresponding to the area selected in accordance with the area selection signal S_A1/A2, the final output gamma voltages also have a value corresponding to the selected area.

In this way, in order to supply different gamma voltages for the first display area A1 and second display area A2, different gamma registers for outputting gamma voltages are used for the first display area A1 and the second display area A2. A circuit for generating gamma voltages requires no hardware modification, and, as shown in FIG. 7, different gamma voltages GAMMA_A1 and GAMMA_A2 can be supplied for each area by using multiplexers MUS which selectively output values from a flip-flop storing the gamma voltages for the first display area A1 and second display area A2 in accordance with the area selection signal S_A1/A2. A register table for outputting gamma voltages for the first display area A1 and second display area A2 can be configured as follows:

<Register Table>

| Register | A1 | A2 |
|---|---|---|
| GAMMA_TOP | GAMMA_TOP_A1 | GAMMA_TOP_ |
| RG_AM2 | RG_AM2_A1 | RG_AM2_A2 |
| RG_GR5 | RG_GR5_A1 | RG_GR5_A2 |
| RG_GR4 | RG_GR4_A1 | RG_GR4_A2 |
| RG_GR3 | RG_GR3_A1 | RG_GR3_A2 |
| RG_GR2 | RG_GR2_A1 | RG_GR2_A2 |
| RG_GR1 | RG_GR1_A1 | RG_GR1_A2 |
| RG_GR0 | RG_GR0_A1 | RG_GR0_A2 |
| RG_AM1 | RG_AM1_A1 | RG_AM1_A2 |
| RG_AM0 | RG_AM0_A1 | RG_AM0_A2 |

FIG. 8 is a driving waveform diagram of the display device of FIG. 4, which illustrates the states of input gamma voltages when the second display area A2 extends to a 120th horizontal line and the first display area A1 starts from a 121th horizontal line.

Referring to FIG. 8, a scan signal is sequentially supplied to the gate lines GL1 to GLm in synchronization with an Hsync signal to store data voltages in the sub-pixels SP of the corresponding lines.

As a scan signal is supplied in synchronization with a Hsync signal, data supplied from the image processor 110 to the timing controller 120 is sequentially stored in the sub-pixels SP of the second display area A2. Here, the data driver 140 converts data signals supplied from the timing controller 120 to data voltages and outputs them, based on second area R pixel (R), G pixel (G), and B pixel (B) gamma voltages R GAMMA_A2, G GAMMA_A2, and B GAMMA_A2 which are provided from the gamma part 160. Gamma voltages are inputted in such a way that higher data voltages are applied to the second display area A2 with lower PPI Afterwards, a scan signal is supplied to the sub-pixels SP in the first display area A1, from the 121th horizontal line onward. The gamma part 160 supplies first area R pixel (R), G pixel (G), and B pixel (B) gamma voltages R GAMMA_A1, G GAMMA_A1, and B GAMMA_A1, from the first line onward in the first display area A1. The data driver 140 converts data signals supplied from the timing controller 120 to data voltages and output them, based on the first area R pixel (R), G pixel (G), and B pixel (B) gamma voltages R GAMMA_A1, G GAMMA_A1, and B GAMMA_A1, which are inputted from the gamma part 160.

The gamma part 160 can change gamma voltages upon receiving a scan signal or Hsync for selecting the 121th horizontal line to switch from the second display area A2 to the first display area A1.

As explained above, in the present invention, if a single display panel comprises different PPI areas, the gamma part 160 supplies different gamma voltages GAMMA_A1 and GAMMA_A2 for the first display area A1 and second display area A2 to apply higher data voltages to the second display area A2 with lower PPI, in order to solve the problem of the second display area A2 with lower PPI being seen to have lower brightness than the first display area A1 with higher PPI.

Figure 9:
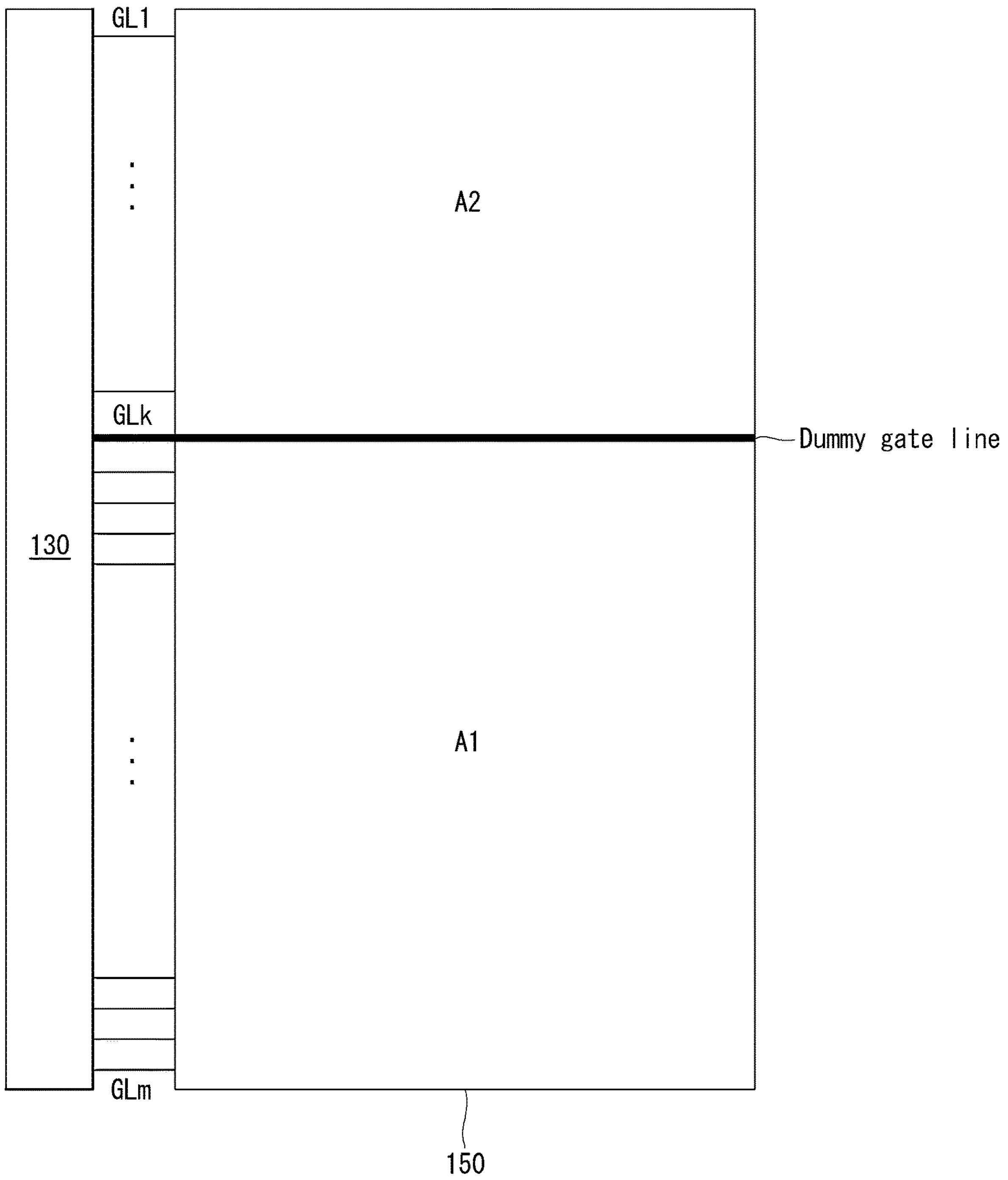
FIG. 9 is a view explaining a control method for a display device according to a second exemplary embodiment of the present invention.
Figure 10:
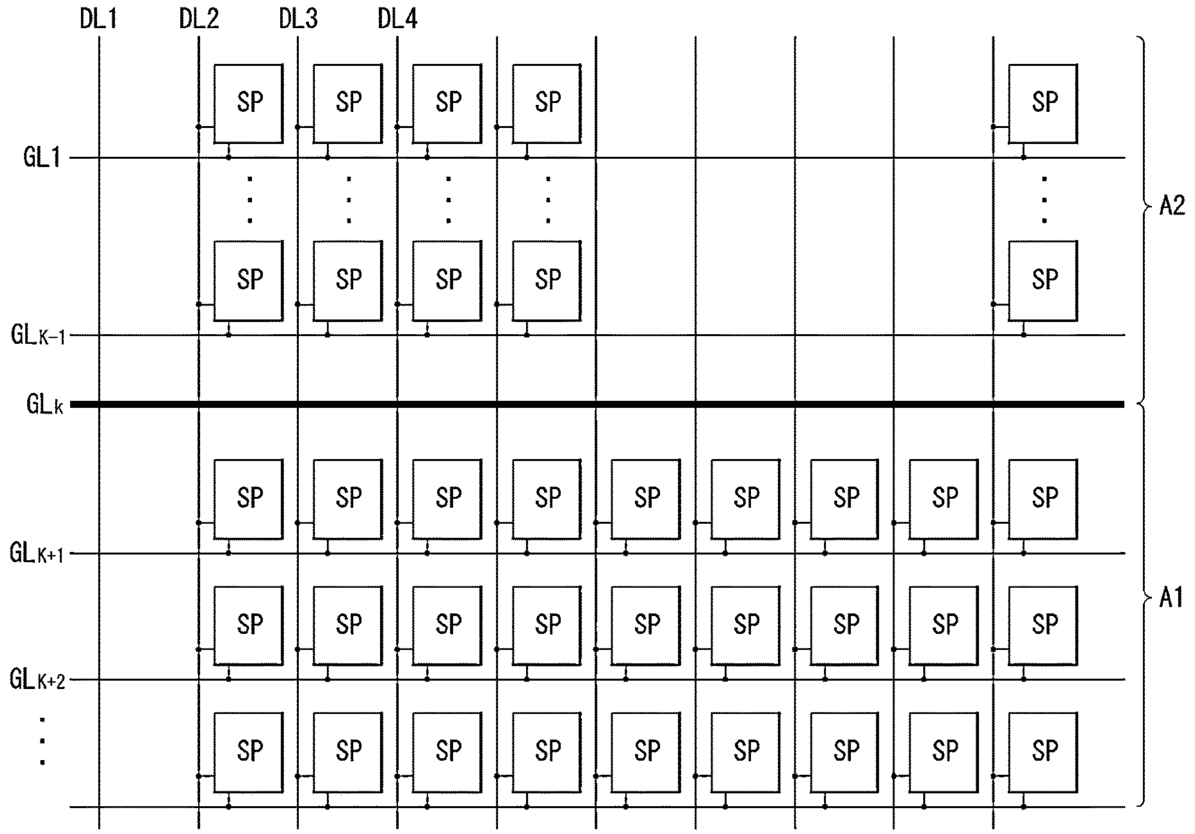
FIG. 10 is a view illustrating an arrangement of sub-pixels on the display panel of FIG. 9.
Figure 11:
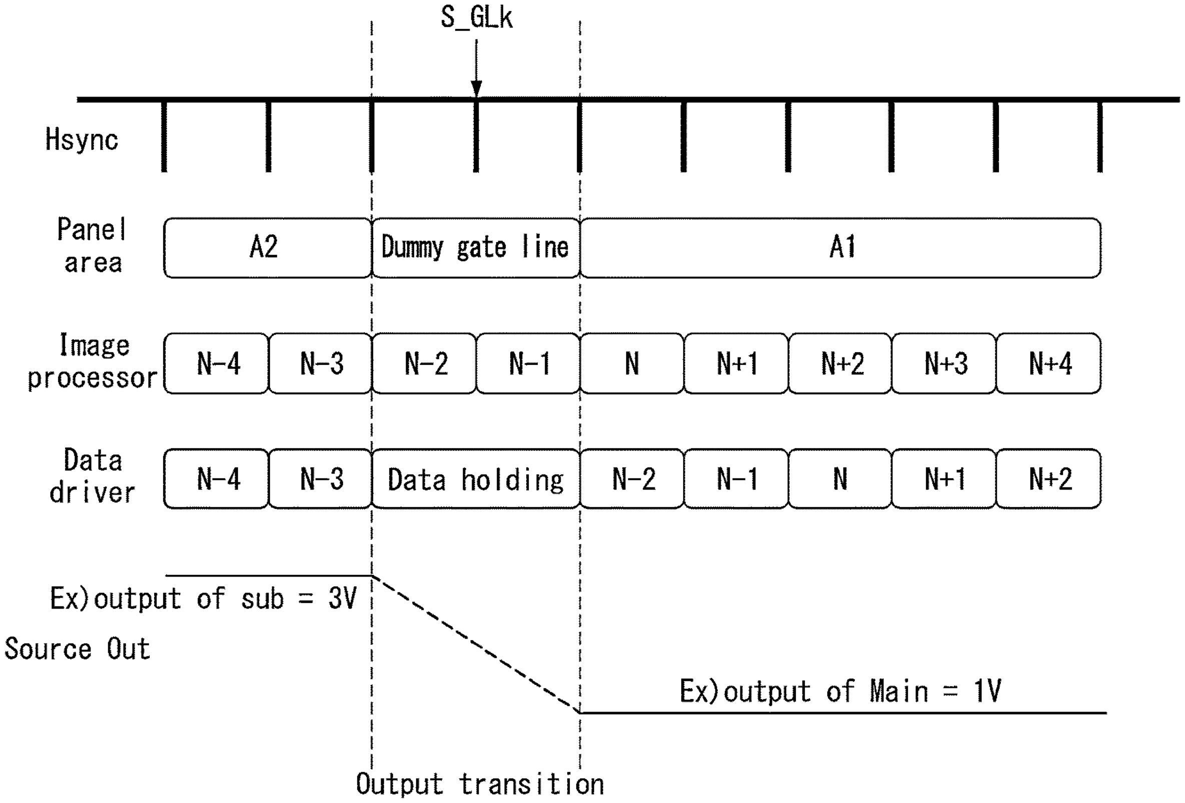
FIG. 11 is a driving waveform diagram of the display device of FIG. 9.

FIGS. 9 to 11 are views explaining a control method for a display device according to a second exemplary embodiment of the present invention. Particularly, FIG. 9 is a view illustrating an arrangement of gate lines in a display device. FIG. 10 is a view illustrating an arrangement of sub-pixels SP on the display panel of FIG. 9. FIG. 11 is a driving waveform diagram of the display device of FIG. 9.

Referring to FIG. 9, a dummy gate line GLk can be arranged between the first display area A1 and the second display area A2.

The first display area A1 and the second display area A2 are divided along the gate lines. That is, if the gate lines are horizontal, the first display area A1 and the second display area A2 are vertically adjacent to each other, and if the gate lines are vertical, the first display area A1 and the second display area A2 are horizontally adjacent to each other.

The sub-pixels SP in the first display area A1 are connected to the gate lines GL arranged in the first display area A1, and the sub-pixels SP in the second display area A2 are connected to the gate lines GL arranged in the second display area A2. A dummy gate line GLk can be arranged between the first display area A1 and the second display area A2.

Referring to FIG. 10, the sub-pixels SP in the second display area A2 can be connected to the 1th to (k−1) th gate lines GL1 to GLk−1. The dummy gate line GLk is disposed after the (k−1) th gate line GLk−1, which is the last gate line in the second display area A2. No sub-pixels SP are connected to the dummy gate line GLk. After that, the sub-pixels SP in the first display area A1 are connected to the gate lines from the gate line GLk+1 onward.

The gate lines GL1 to GLm are connected to the scan driver 130 and output a scan signal of scan-high voltage and scan-low voltage. The scan driver 130 sequentially supplies a scan signal to the gate lines GL1 to GLm to turn on the switching transistors SW of the sub-pixels SP. Although no sub-pixels SP are connected to the dummy gate line GLK, the scan signal is supplied to it after the scan signal is supplied to the (k−1)th gate line GLk−1, which is the last gate line in the second display area A2.

FIG. 11 is a driving waveform diagram of the display device of FIG. 9, which explains in detail the state of input data when a scan signal is supplied to the gate lines GL1 to GLm including the dummy gate line GLk.

Referring to FIG. 11, on the display panel of FIG. 9, a scan signal is sequentially supplied to the gate lines GL1 to GLm in synchronization with a Hsync signal. Thus, the scan signal is sequentially supplied to the gate lines GL1 to GLk−1 connected to the sub-pixels SP in the second display area A2.

As a scan signal is supplied, data N−4 and N−3 supplied from the image processor 110 to the timing controller 120 are sequentially stored in the sub-pixels SP in the second display area A2. Here, the data driver 140 converts the data signals N−4 and N−3 supplied from the timing controller 120 to data voltages and outputs them, based on a second area gamma voltage GAMMA_A2 provided from the gamma part 160. Higher data voltages are applied to the second display area A2. In this exemplary embodiment, the output voltage of the data driver 140 is illustrated to be 3 V.

The scan signal is supplied to the dummy gate line GLk after the scan signal is supplied to the (k−1) th gate line GLk−1, which is the last gate line in the second display area A2. Since no sub-pixels SP are connected to the dummy gate line GLk, data signals N−2 and N−1 supplied from the timing controller 120 are held at the data driver 140. As such, no voltage is outputted from the data driver 140, and therefore the previously supplied voltage of 3V gradually diminishes (output transition). In this way, the output voltage in the second display area A2 is released while a scan signal is supplied to the dummy gate line GLk, so that, in turn, the data driver 130 can stably supply data voltages when lower data voltages are applied.

Thereafter, a scan signal is supplied to the sub-pixels SP in the first display area A1, from the (k+1) th gate line GLk+1 onward. From the first line onward in the first display area A1, data signals N, N+1, and N+2, subsequent to the data signals N−2 and N−1 held at the data driver 140, are sequentially stored. Here, the data driver 140 converts the data signals N−2, N−1, N, N+1, and N+2 supplied from the timing controller 120 to data voltages and outputs them, based on a first area gamma voltage GAMMA_A1 provided from the gamma part 160. Since lower data voltages are applied to the first display area A1, a voltage of about 1 V is stored in the sub-pixels SP in the first display area A1.

With this configuration, in the present invention, the gamma part 160 supplies different gamma voltages GAMMA_A1 and GAMMA_A2 for the first display area A1 and second display area A2 so that higher data voltages are applied to the second display area A2 with lower PPI than to the first display area A1 with higher PPI, and, at the same time, a dummy gate line GLk is arranged between the first display area A1 and the second display area A2 so that the output voltage changes stably with changing gamma voltage GAMMA_A1/GAMMA_A2.

Figure 12:
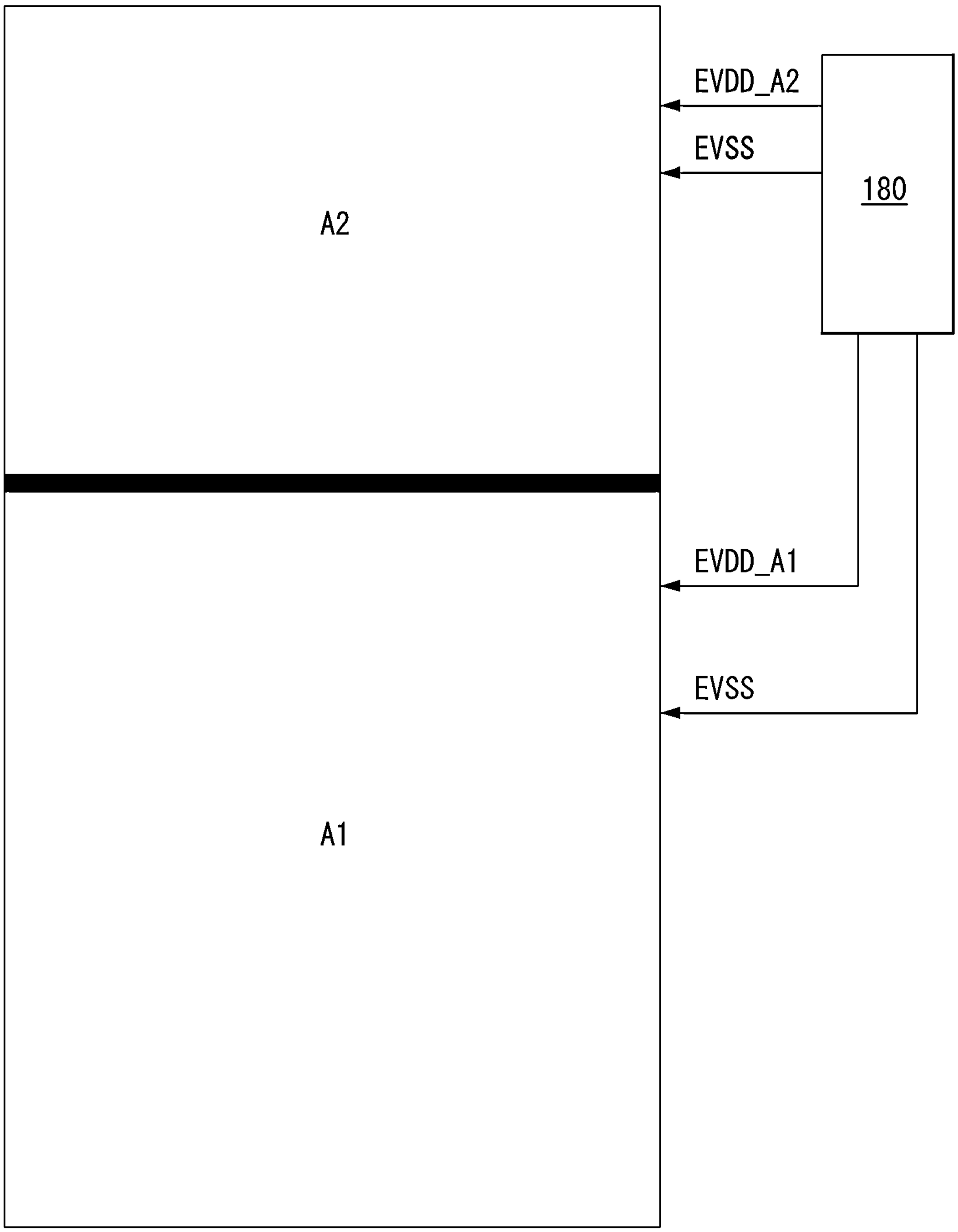
FIG. 12 is a view explaining a control method for a display device according to a third exemplary embodiment of the present invention.

FIG. 12 is a view schematically illustrating a control block in a display device according to a third exemplary embodiment of the present invention.

In the third exemplary embodiment of the present invention, different gamma voltages GAMMA_A1 and GAMMA_A2 are supplied for the first display area A1 and the second display area A2, and the high-potential power EVDD supplied to the sub-pixels SP also varies.

To this end, referring to FIG. 12, the power supply part 180 can generate second display area high-potential power EVDD_A2, which is supplied to the second display area A2, first display area high-potential power EVDD_A1, and low-potential power EVSS. Since the second display area A2 with lower PPI requires higher data voltage application than the first display area A1 with higher PPI, the second display area high-potential power EVDD_A2 can have a higher potential than the first display area high-potential power EVDD_A1.

The power supply part 180 can supply the second display area high-potential power EVDD_A2 and the low-potential power EVSS to the second display area A2 and supply the first display area high-potential power EVDD_A1, which has a lower potential than the second display area high-potential power EVDD_A2, and low-potential power EVSS to the first display area A1.

Figure 13:
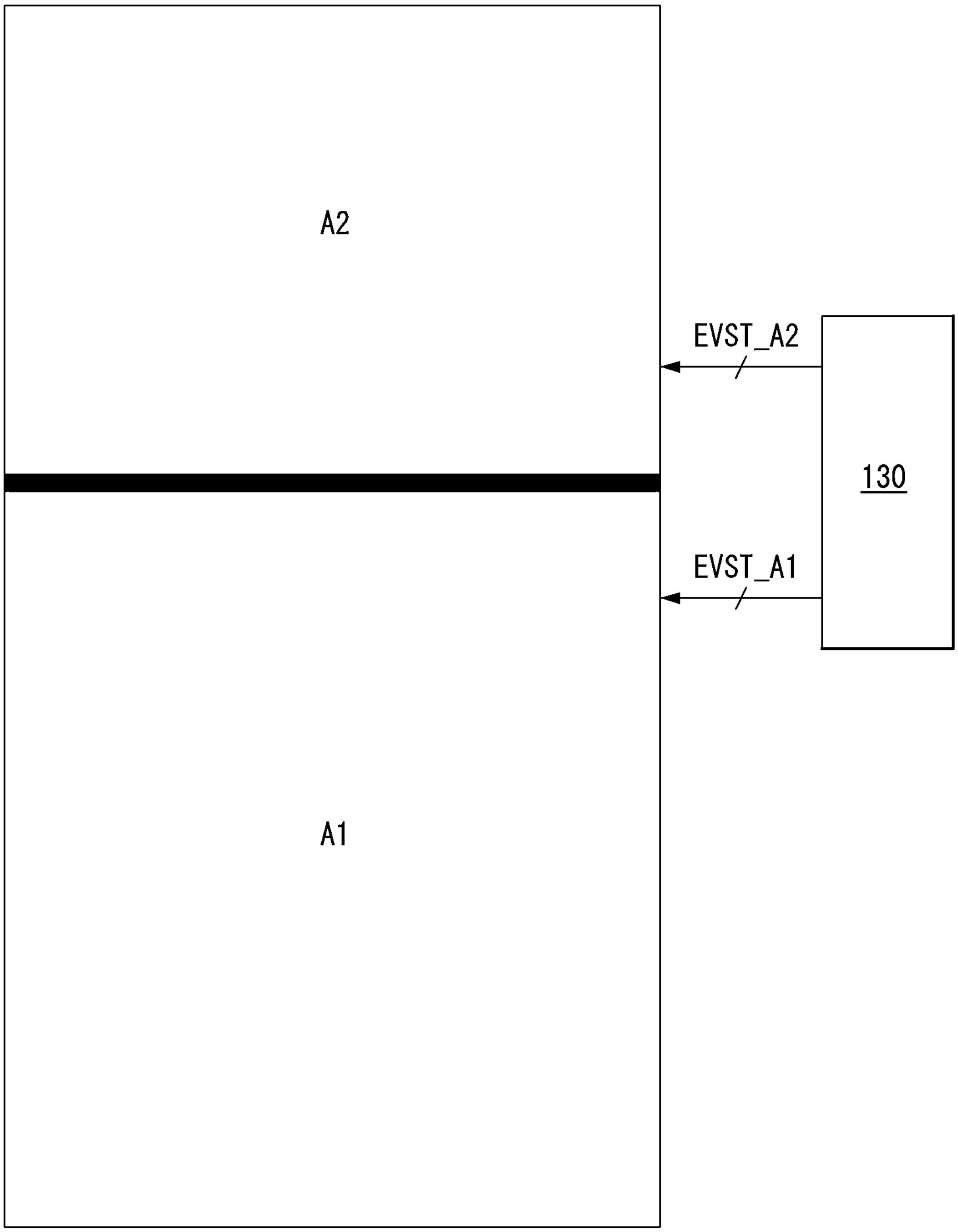
FIG. 13 is a view explaining a control method for a display device according to a fourth exemplary embodiment of the present invention.
Figure 14:
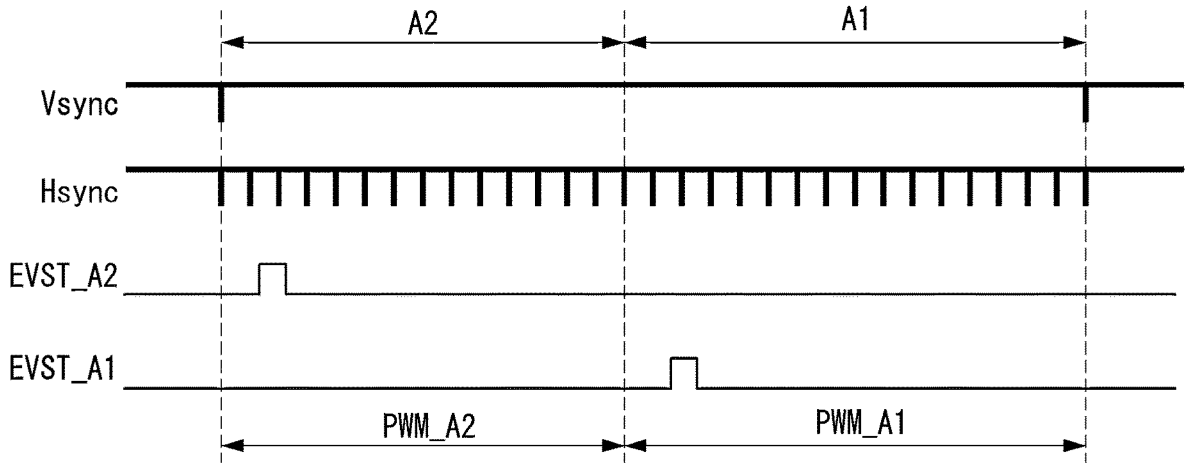
FIG. 14 is a driving waveform diagram of the display device of FIG. 13.

FIGS. 13 and 14 are views explaining a control method for a display device according to a fourth exemplary embodiment of the present invention. Particularly, FIG. 13 schematically illustrates a control block in the display device according to the fourth exemplary embodiment. FIG. 14 illustrates driving waveforms of the display device of FIG. 13.

In the fourth exemplary embodiment of the present invention, different gamma voltages GAMMA_A1 and GAMMA_A2 are supplied to the first display area A1 and the second display area A2, and at the same time the emission time of the sub-pixels SP is modulated to vary by pulse width modulation (PWM). In pulse width modulation, the wider the pulse width, the longer the emission time, and the narrower the pulse width, the shorter the emission time. Using this nature of PWM, the pulse width can be modulated by an emission vertical start signal (EVST) outputted from the scan driver 130.

Referring to FIGS. 13 and 14, the scan driver 130 supplies a first display area EVST EVST_A1 to the first display area A1 and a second display area EVST EVST_A2 to the second display area A2.

Since the second display area A2 with lower PPI requires a longer emission time than the first display area A1 with higher PPI, the pulse width PWM_A1 for the first display area A1 can be modulated to be narrower in response to the first display area EVST EVST_A1, and the pulse width PWM_A2 for the second display area A2 can be modulated to be wider in response to the second display area EVST EVST_A2.

As explained above, in the present invention, if a single display panel comprises different PPI areas, the gamma part 160 supplies different gamma voltages GAMMA_A1 and GAMMA_A2 to the first display area A1 and second display area A2 to apply higher data voltages to the second display area A2 with lower PPI, in order to solve the problem of the second display area A2 with lower PPI being seen to have lower brightness than the first display area A1 with higher PPI.

Along with this, a dummy gate line GLk is arranged between the first display area A1 and the second display area A2 so that the output voltage changes stably with changing gamma voltage GAMMA_A1/GAMMA_A2.

Moreover, the second display area high-potential power EVDD_A2 can have a higher potential than the first display area high-potential power EVDD_A1, so as to further reduce the brightness difference between the first display area A1 with higher PPI and the second display area A2 with lower PPI. Also, the second display area pulse width PWM_A2 can be modulated to be wider than the first display area pulse width PWM_A1, which increases the emission time for the second display area A2, thereby ensuring brightness uniformity.

Although preferred embodiments of the present invention are described above with reference to the accompanying drawings, it is understood that those skilled in the art can embody the technical configuration in other specific forms without changing the technical spirits and essential features of the present invention. Therefore, it should be understood that the embodiments described above are exemplary and not restrictive in all aspects, and the scope of the present invention is defined by the appended claims rather than the above specific descriptions. It should be interpreted that all the changed and modified forms derived from the meaning, scope and equivalent concepts of the claims are included in the scope of the present invention.

What is claimed is:

1. A display device comprising:

a display panel comprising a first display area in which sub-pixels are arranged and a second display area in which the sub-pixels are not arranged in at least a portion;

a plurality of data lines disposed on the display panel;

a gate driver configured to supply at least one gate signal to the first display area and the second display area; and at least one dummy gate line disposed over the second display area, to which no sub-pixels are connected and arranged to intersect the plurality of data lines.

2. The display device of claim 1, further comprising:

a gamma part configured to generate a first area gamma voltage for the first display area and a second area gamma voltage for the second display area; and a data driver configured to generate data voltages by applying the first area gamma voltage to video data displayed in the first display area and applying the second area gamma voltage to video data displayed in the second display area, and supply the data voltages to the sub-pixels in corresponding areas.

3. The display device of claim 2, wherein the gamma part comprises:

a resistor string configured to receive a maximum gamma voltage at one end and a minimum gamma voltage at the other end and divide the maximum gamma voltage and the minimum gamma voltage into a plurality of voltages and output the plurality of voltages;

a minimum and maximum gray level gamma voltage selection part configured to receive the plurality of voltages outputted from the resistor string and select and output a 0 gray level gamma voltage, which is a minimum gray level, a 1 gray level gamma voltage, and a 255 gray level gamma voltage, which is a maximum gray level;

a tap voltage output part configured to supply a plurality of tap voltages; and a voltage-dividing circuit configured to receive and divide a minimum gray level gamma voltage, a maximum gray level gamma voltage, and the plurality of tap voltages to produce 0 to 255 gray level gamma voltages.

4. The display device of claim 3, wherein the resistor string selectively receives a maximum gamma voltage for the first display area and a maximum gamma voltage for the second display area.

5. The display device of claim 3, wherein the minimum and maximum gray level gamma voltage selection part selects and outputs a 0 gray level gamma voltage, which is the minimum gray level, a 1 gray level gamma voltage, and a 255 gray level gamma voltage, which is the maximum gray level, in accordance with a selection signal for selecting the first display area or the second display area.

6. The display device of claim 3, wherein the tap voltage output part selects and outputs a tap voltage among the plurality of tap voltages in accordance with a selection signal for selecting the first display area or the second display area.

7. The display device of claim 2, wherein the display panel further comprises:

the plurality of data lines connected to the data driver, wherein each the plurality of data lines is disposed to extend through both the first display area and the second display area.

8. The display device of claim 1, further comprising:

a power supply configured to generate first display area high-potential power for the first display area and second display area high-potential power for the second display area, and supply the first and second display area high-potential powers to corresponding display areas.

9. The display device of claim 8, wherein the power supply part supplies high-potential power of higher potential to either the first display area or the second display area, whichever has fewer sub-pixels.

10. The display device of claim 1, wherein the at least one gate signal includes a scan signal and an emission signal.

11. The display device of claim 10, wherein the gate driver controls the sub-pixels in the first display area and the sub-pixels in the second display area to have different emission times through the emission signal.

12. The display device of claim 11, wherein the gate driver supplies a pulse width modulation control signal so that either the first display area or second display area, whichever has fewer sub-pixels, has a longer emission time.

13. The display device of claim 1, wherein the first display area and the second display area differ in a number of sub-pixels per unit area.

14. The display device of claim 1, further comprising:

a data driver configured to supply data voltages to the sub-pixels of the first and second display areas through the plurality of data lines, wherein, while the at least one gate signal is supplied to the at least one dummy gate line, an output data voltage of the data driver transitions from a second data voltage corresponding to the second display area to a first data voltage corresponding to the first display area.

15. A display device comprising:

a display panel comprising a first display area in which sub-pixels are arranged and a second display area in which the sub-pixels are not arranged in at least a portion;

a plurality of data lines disposed on the display panel; and at least one dummy gate line disposed between the first display area and the second display area, to which no sub-pixels are connected and arranged to intersect the plurality of data lines, wherein each of the sub-pixels includes:

a switching transistor connected to a gate line; and a pixel circuit including a driving transistor that is turned on in response to a data voltage stored in a storage capacitor, and is supplied with a driving current to an organic light-emitting diode, the organic light-emitting diode being configured to emit light in response to the drive current, and being driven in response to the data voltage supplied through the switching transistor.

16. The display device of claim 15, further comprising:

a data driver configured to generate data voltages, and supply the data voltages to the sub-pixels in corresponding display areas; and a power supply part configured to generate first display area high-potential power for the first display area and second display area high-potential power for the second display area, and supply the first and second display area high-potential powers to the corresponding display areas.

17. The display device of claim 16, further comprising a scan driver configured to supply a scan signal to the first display area and the second display area.

18. The display device of claim 17, wherein the display panel comprises:

the plurality of data lines connected to the data driver and a plurality of gate lines connected to the scan driver; and the at least one dummy gate line between the first display area and the second display area, to which no sub-pixels are connected.

19. The display device of claim 17, wherein the data driver supplies no data voltage by holding video data while the scan signal is supplied to the dummy gate line.

20. The display device of claim 17, wherein the scan driver controls the sub-pixels in the first display area and the sub-pixels in the second display area to have different emission times.

21. The display device of claim 17, wherein the scan driver supplies a pulse width modulation (PWM) control signal so that that either the first display area or the second display area, whichever has fewer sub-pixels, has a longer emission time.

22. The display device of claim 16, wherein the power supply part supplies high-potential power of higher potential to either the first display area or the second display area, whichever has fewer sub-pixels.

* * * * *